Feb. 1, 1966 J. D. BENNETT ETAL 3,232,115
APPARATUS FOR RECORDING PRESSURE CONDITIONS IN BORE HOLES
Filed March 28, 1963 4 Sheets-Sheet 1

INVENTORS
JOHN D. BENNETT
PRESTON E. CHANEY
JACK WEIR JONES &
FRED M. MAYES
BY
ATTORNEYS

Feb. 1, 1966  J. D. BENNETT ETAL  3,232,115
APPARATUS FOR RECORDING PRESSURE CONDITIONS IN BORE HOLES
Filed March 28, 1963  4 Sheets-Sheet 2

INVENTORS
JOHN D. BENNETT
PRESTON E. CHANEY
JACK WEIR JONES &
FRED M. MAYES
BY
ATTORNEYS

3,232,115
APPARATUS FOR RECORDING PRESSURE CONDITIONS IN BORE HOLES
John D. Bennett, Richardson, Preston E. Chaney, Dallas, and Jack Weir Jones and Fred M. Mayes, Richardson, Tex., assignors to Sun Oil Company, Philadelphia, Pa., a corporation of New Jersey
Filed Mar. 28, 1963, Ser. No. 268,657
6 Claims. (Cl. 73—398)

This invention relates to measuring apparatus and particularly to apparatus suitable for use in bore holes for the measurement of pressure or temperature.

The invention relates to apparatus which is pressure-responsive, and it will be described with particular reference to an apparatus for measuring pressures existing in bore holes, the measured pressure being recorded as a function of time. However, known types of apparatus are used to measure temperatures utilizing thermometric elements giving rise to pressures as the results of variations of vapor pressures of liquids with temperature. As will become obvious, the present apparatus may be used to measure temperatures by way of response to pressures to which the temperatures give rise.

In connection with the control of oil-producing reservoirs it is frequently desirable to obtain records of variations of pressure with time by means of apparatus located in bore holes containing liquid. The pressure variations coupled with the known history of production or other manipulations of the reservoir give valuable information as to conditions in the reservoir.

For the purpose of making such pressure measurements, gauges have been provided, a well-known type of which has the following characteristics:

A bellows is subjected to the ambient pressure and contains a liquid transmitting this pressure to the interior of a Bourdon tube arranged as a long helix so as to produce rotation of a shaft connected to the free end of the Bourdon tube. This shaft is coupled to a scriber to rotate the scriber relative to a cylindrical sheet on which it may produce marking. The scriber is also moved axially of this sheet by a clock mechanism to provide a time abscissa.

The foregoing type of gauge, however, has various limitations. The use of a mechanical clock limits the period of operation, typically to about 72 hours. In many cases it would be desirable to have the operation extended for much longer periods such as might be timed by an electrically-operated clock. Since electrical isolation from the surface is most convenient, without undue complexity, an electric clock would have to be operated by batteries, the drain on which would limit the period of operation.

But another more significant limitation also exists in the matter of accuracy of measurement. Desirably, the gauge should record very small pressure differences against a background of very high pressure such as exists at the bottom of a deep bore hole. The rotation of the stylus by a Bourdon tube is of quite limited extent, and difficulty exists in the measurement of small pressure changes. Furthermore, if a Bourdon tube of practical helical type is used, such a tube by reason of its very considerable length is quite sensitive to mechanical drag of the stylus, and there is, in effect, a blacklash giving rise to inaccuracy in view of the small movements per unit pressure change which are involved.

It is the broad object of the present invention to provide a gauge which overcomes the above indicated and other deficiencies of the known types of gauge. Briefly, in accordance with the invention, a pressure-sensing arrangement is used similar to that just described. The Bourdon tube, however, is called upon to exert only a minute mechanical force by turning merely a secondary coil of a differential transformer of rotation-sensing type, which secondary coil may be mounted in jewel bearings so as to be movable with only minute restraint. A follow-up system driven by a motor serves to drive the primary assembly of the differential transformer to locate it in a null position relative to the secondary coil. Intermittent operation of the motor is provided to minimize battery drain.

Furthermore, the motor is associated with driven reduction gearing in such fashion as to impart to a stylus much magnified movement in comparison with the movements of the primary assembly of the differential transformer. Being driven by a motor, frictional resistance to movement of the stylus is unimportant; but to improve still further the accuracy of reading a system is used which eliminates backlash by causing the movements of the stylus to its recording positions to take place in only one direction. The ratio of rotational stylus movements to the rotational movements of the secondory coil of the differential transformer may be of the order of twenty to one, making readings of the pressure changes achievable to a high degree of accuracy.

Furthermore, clockwork control is provided further minimizing battery drain so that the gauge may be operated over very extended periods of time.

The foregoing general object and others relating to details of construction and operation will become apparent from the following description, read in conjunction with the accompanying drawings, in which.

Figure 1:
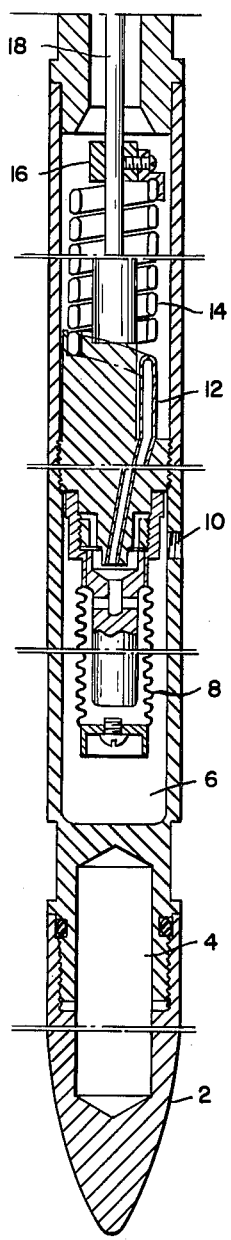
FIGURE 1 is an axial sectional view of the lowermost portion of an apparatus provided in accordance with the invention.
Figure 5:
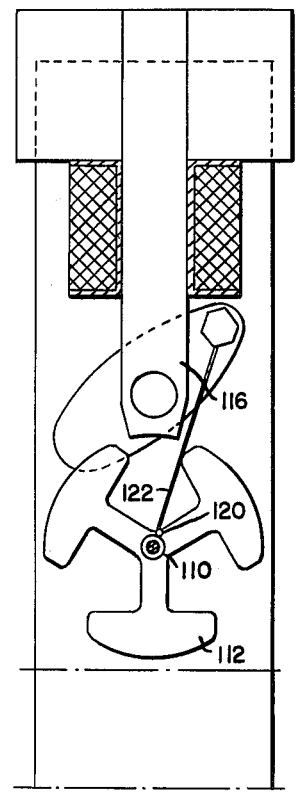
FIGURE 5 is a diagrammatic sectional view showing details of the clock mechanism.

The apparatus comprises a protective casing 2 which is indicated only at the bottom of the instrument illustrated. This casing, as is usual with bore hole instruments, is constructed so as to be capable of withstanding the highest pressures which may be encountered in deep holes. It is provided at its upper end with the conventional arrangement (not shown) for connection to a supporting wire line. While current might be provided through a cable carrying conductors, this leads to additional complexity, and the gauge in its most desirable form contains elements which operate independently of control or power supply from the surface. It may be noted that an instrument of this type is generally required to be of very small outside diameter, for example of the order of 1¼ inches, but length is not of particular significance, and accordingly, as will appear, the overall design is such that the apparatus is quite extended lengthwise.

The lower portion of the gauge is similar to the mechanically operating gauge described above, and this may be briefly described without particular reference to conventional details. The lower portion of the gauge may be provided with a chamber 4 for the reception of a thermometer for measuring maximum temperatures. From the standpoint of the present invention, the first element of significance is the chamber 6 in which is located the bellows 8. The portion of the chamber 6 external to the bellows desirably contains oil for protection of the bellows and is open at its upper end as indicated at 10 to the external bore hole liquid so that the pressure of this liquid is transmitted through the oil to the bellows. The upper end of the bellows is connected through tube 12 to the lower end of the helical Bourdon tube 14, the bellows, connecting tube and Bourdon tube being filled with oil. The Bourdon tube 14 is anchored at its lowered end, and its upper end is connected to a rotatable shaft 18 by means of a coupling 16. Pressure changes apply to the Bourdon tube accordingly effect rotation of the shaft 18. This shaft in the present apparatus corresponds to the shaft which rotates a stylus in the known type of apparatus.

The shaft 18 which is mounted in low-friction bearings carries a head 19 in which is mounted, for ease of assembly, a transverse light spring 20 engageable within V-shaped slots in a block 22 secured to the downwardly extending shaft 24 of a secondary coil 26 of a differential transformed. Both the lower and upper shafts of this coil are mounted in jewel bearings in the primary assembly 28 of the differential transformer, which assembly is mounted for rotation by a running fit in the cylindrical bore of the surrounding housing.

The differential transformer primary assembly 28 is conventional in character, comprising the winding 30 and the core, the inner part of which is indicated at 32, and the outer part of which is indicated at 33. The core assembly is one unit. However a pair of spaces 35 is provided in the core to accommodate movement of the secondary 26. The differential transformer is of a type in which the secondary winding 26 is of split type having two opposing sections moving in the field of the primary assembly so that a zero output is provided from the secondary when the primary and secondary occupy a predetermined position, while for deviations from this outputs of opposite phases are produced. Such a differential transformer is extremely sensitive to deviations of the angular relationship of the elements from the null or balanced position. Leads (not shown) of conventional high flexibility provide the output from the secondary coil. Similarly flexible leads provide exciting current to the primary winding.

Shaft 34, being part of assembly 28, rotates with the assembly. It is secured to the output shaft 36 of a gear reduction assembly 38 of quite conventional type arranged to be driven by a motor 40 which is of a reversible direct current type provided with a permanent magnet field. The upper end 42 of the motor shaft provides the input drive to a second gear reduction unit 44, also of conventional type, provided with an output shaft 46.

It is the last assembly of the motor and the two reduction gear units that provides the mechanical amplification which is desired. By choices of the reduction gear ratios, it will be evident that the speed ratio of shaft 46 to shaft 36 may be chosen as desired; and in a typical satisfactory arrangement, this ratio was chosen as 22:1. The movement of the primary assembly of the differential transformer, corresponding to movement of the upper end of the Bourdon helix, is thus amplified to the extent just indicated into the movements of the shaft 46 which, as will presently be noted, provides corresponding angular movements of the recording stylus.

The shaft 46 is coupled through the toothed clutch 48, to permit flexibility, to a member 50 secured to an upwardly extending rod 52 and centrally provided with a bearing 54 mounting a lead screw 56. This lead screw 56 may be as long as desired for an extended period of operation, determining by its rotation the travel of a stylus carriage. It extends through a section of the instrument indicated at 60 within which there is located the support 62 for the cylindrical record member or chart 63 on which a record is to be scribed. The arrangement of this chart in its support and its nature are of the type used in the instrument previously described, the chart consisting, for example, of a thin metallic sheet carrying on its inner surface a coating which may be marked by the stylus or scriber. When in place, this chart provides a substantially continuous interior cylindrical surface for marking.

A nut 64 threaded on the lead screw 56 provides the carriage for the marking stylus. It is provided with a smooth bore 66 sliding on the rod 52 to prevent turning with respect to this rod. A spring 68 secured to the nut 64 carries the stylus point 70. A member 72 secured to the upper end of the guide rod 52 is provided with a central bearing 74 which mounts the lead screw 56 for rotation. A spring 76 is provided to elongate the stylus assembly against the couplings 48 and 80 to eliminate backlash.

A clutch consisting of the toothed elements 78 and 80 provides coupling between the upper end of the screw 56 and a shaft 82 which is driven by a clock mechanism, the shaft 82 being mounted in a bearing 83 and carrying at its upper end a bevel gear 84 meshing with a bevel gear 86 mounted on a stub shaft 88 and secured to a gear 90 driven by a pinion 92 secured to a transverse shaft 94. This shaft carries a disc 96 provided with a pair of lobes for electrical control as hereafter described.

The shaft 94 is provided with a screwdriver slot 98 for coupling to a crank for presetting of the stylus to an initial position. Frictionally coupled to the shaft 94 in the usual fashion provided for setting of clocks is the gear 100 which meshes with the pinion 102 carried by a shaft 104. This shaft also carries a wormwheel 106 arranged to be driven by the worm 108 driven through a driving escapement mechanism 109 of conventional type from an oscillating shaft 110 mounted in jewel bearings and carrying an inertia element 112 which takes the form of a three-lobed spider. A hair spring 114 is connected between a fixed anchorage and the shaft 110 and this, in association with the inertia element 112 primarily determines the period of oscillation of the shaft 110. A magnetic core member 116 provides drive for the inertia member 112, constituting part of an electromagnet having a winding 118. Desirably the core member 116 is of a permanently magnetized type to provide a bias in the driving system.

The hub of the inertia member 112 is provided with a pin 120 engageable during oscillation with a very flexible leaf spring 122 to provide an electrical contact as will appear hereafter. The pin 120 is grounded through the shaft 110 and hairspring 114.

The assembly illustrated terminates in a plug 124 which is provided with contact pins 126 of which only two are shown. These are engageable in a corresponding socket member to provide electrical connection to a portion of the instrument not shown in mechanical detail which surmounts that illustrated and contains batteries and electrical elements constituting the circuitry hereafter more fully described.

Figure 2:
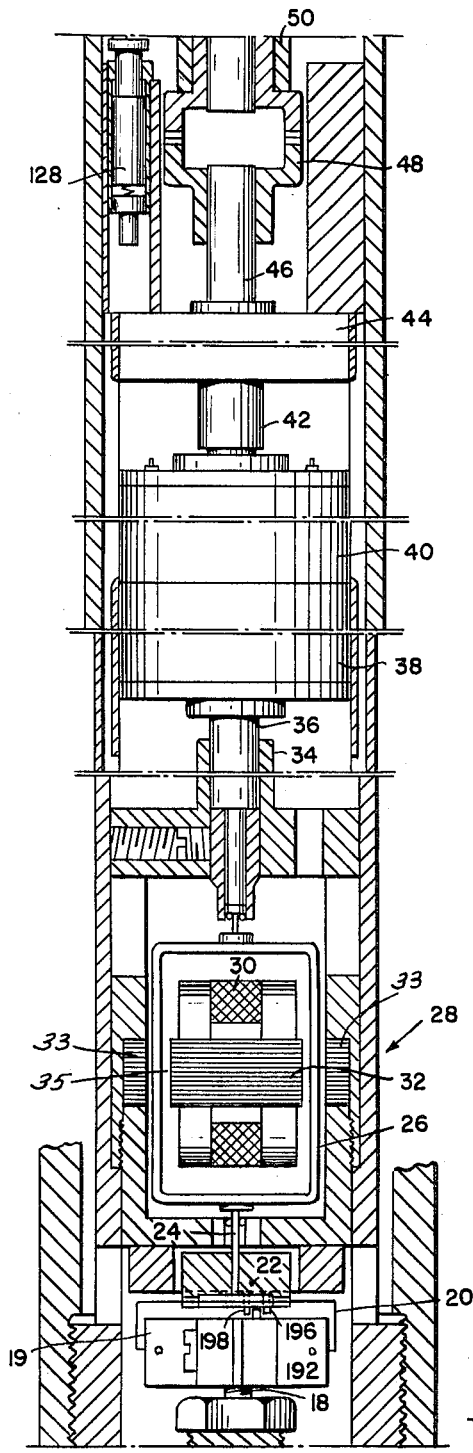
FIGURES 2, 3 and 4 are similar sections of successively upper portions of the same apparatus, shown on a larger scale than FIGURE 1.
Figure 3:
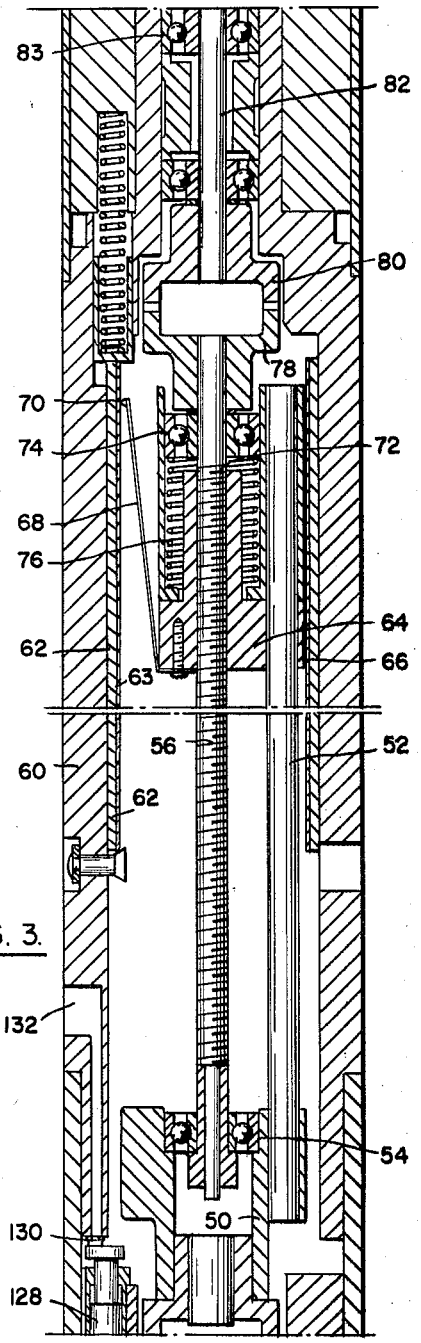
Figure 4:
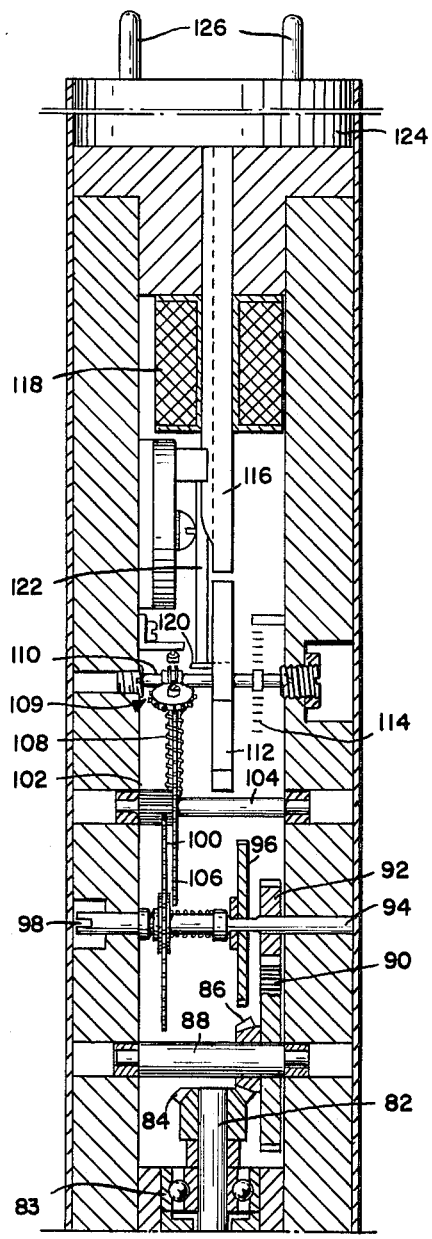
Figure 6:
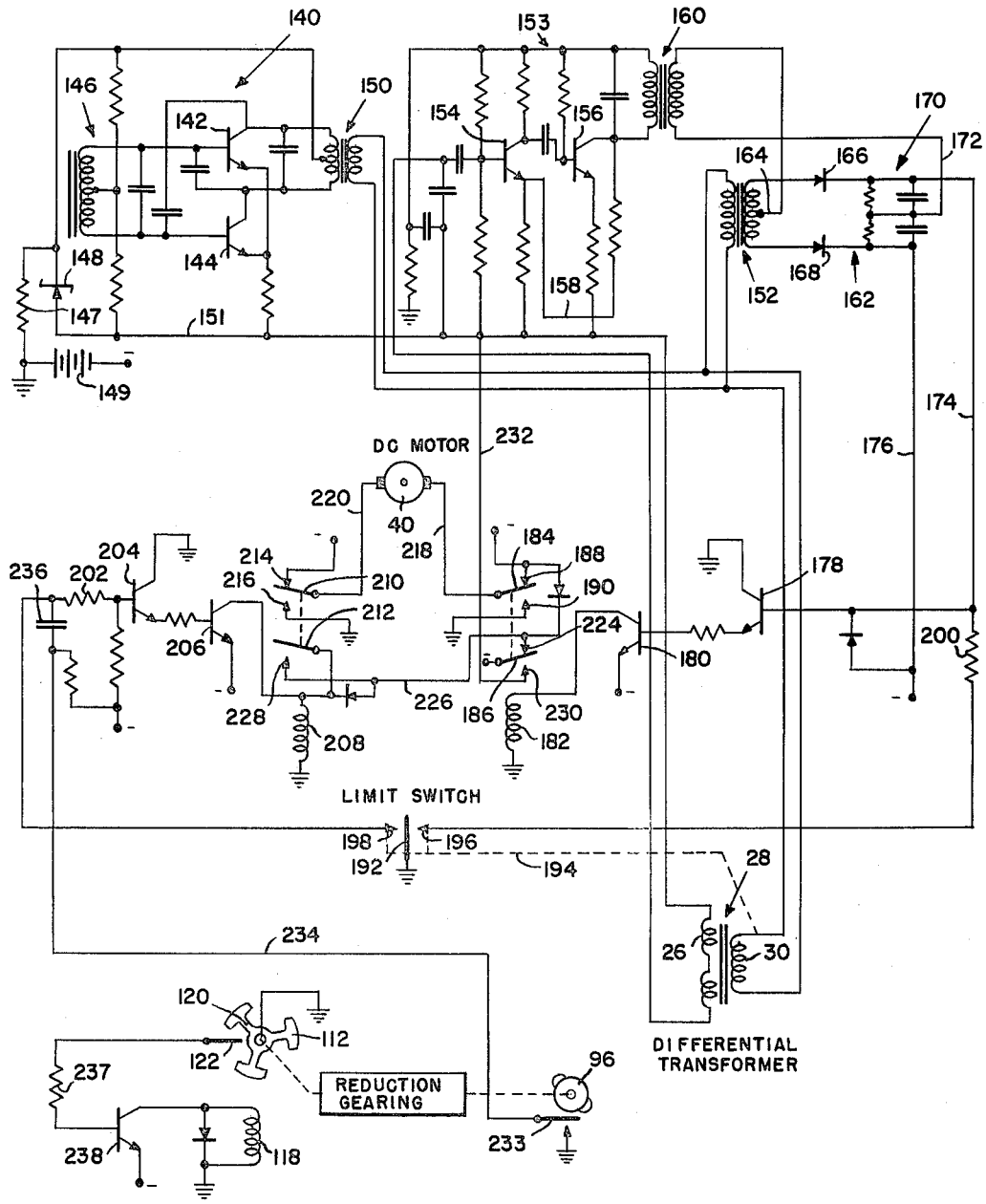
FIGURE 6 is a schematic electrical and mechanical diagram of the apparatus.

While the electrical circuit connections are not shown in detail in the mechanical figures, it may be noted that electrical connections are made in assembly through the medium of spring-pressed contacts as indicated at 128 and 130, in FIGURES 2 and 3 respectively, insulated leads (not shown) being run lengthwise of the instrument through slots in the inner housing elements.

Reference will now be made to the schematic electrical diagram showing the circuitry connected to the various elements already described.

A conventional oscillator is illustrated at 140 and provides an output at any desirable audio frequency, the frequency value being subject to a wide range of choice. It comprises the transistors 142 and 144 connected conventionally to a tuned circuit 146. To provide maintenance of a substantially fixed frequency and also a substantially constant amplitude output, the oscillator circuit is associated with a Zener diode 148 the cathode of which is connected to ground through a resistor 147 while its anode is connected to the common line 151. As will appear, the line 151 is arranged to be connected to the negative supply terminal. The power supply is illustrated at the battery 149 having its positive terminal grounded. The negative terminal illustrated is the same negative terminal as appears elsewhere in the diagram, there being omitted, for the sake of clarity, the numerous interconnections to the various elements which are shown as associated with individual negative terminals.

The output from the oscillator 140 is provided through the transformer 150 which feeds the primary exciting coil 30 of the differential transformer and also the primary winding of a transformer 152 of a phase detection unit.

A conventional transistor amplifier is shown at 153, and comprises a pair of transistors 154 and 156 providing two stages of amplification. To provide stability a feedback is provided at 158 between the collector of transistor 156 and the emitter of transistor 154. The output of the amplifier is delivered through transformer 160. This output is to the phase detector 162 which provides either a positive or negative direct output depending upon the phase of the input to the amplifier. This phase detector 162 includes the secondary winding of transformer 152 the center tap of which is connected to one terminal of the secondary of transformer 160. Diodes 166 and 168 are connected to the end terminals of the secondary of transformer 152, and to the voltage dividing and filtering system shown at 170, the connection from the other end of the secondary of transformer 160 running at 172 to the center of this latter system. The direct output, dependent upon input phase, is provided through the lines 174 and 176. The phase detector acts in conventional fashion, referring the output of the amplifier to the reference provided from the oscillator to the primary winding of transformer 152. Since the operation is conventional it need not be described in detail.

The line 176 is returned to the negative supply terminal, while the line 174 is connected to the base of transistor 178, the collector of which is grounded. The emitter of this transistor is connected through a resistor to the base of a second transistor 180 the emitter of which is returned to the negative supply terminal. Its collector is connected to ground through the relay winding 182. The relay provided with this winding has a pair of movable contacts 184 and 186, the former of which operates between the normally closed fixed contact 188 and the normally opened grounded contact 190. The contact 188 is connected to the negative supply terminal.

Reference may now be made to the movable grounded contact 192 which operates between a pair of contacts 196 and 198. The arrangement of the contacts is illustrated in the mechanical assembly. The contact 192 is carried by the member 19, projecting upwardly therefrom. The contacts 198 and 196 straddle this contact 192 and are carried by the primary assembly of the differential transformer. These latter contacts are insulated from it and connected through flexible leads to the circuitry. The purpose of this arrangement is to provide for only a limited extent of relative rotation between the secondary winding 26 of the differential transformer and the primary assembly. As will appear, signals are provided whenever the contact 192 engages either contact 196 or contact 198.

Contact 196 is connected through resistor 200 to the line 174.

Contact 198 is connected through resistor 202 to the base of transistor 204, the collector of which is grounded, while the emitter thereof is connected through a resistor to the base of another transistor 206 having its emitter connected to the negative supply terminal. The collector of transistor 206 is connected to ground through the winding 208 of a second relay provided with the movable contacts 210 and 212. The upper normally closed contact 214 engaged by the movable contact 210 is connected to the negative supply terminal, while the corresponding normally open contact 216 is grounded. The movable contacts 184 and 210 are respectively connected through lines 218 and 220 to the brush terminals of the motor 40.

The movable contact 186 is connected to the negative supply terminal, and its normally closed contact 224 is connected at 226 to the normally open contact 228 engageable by the movable contact 212 which is connected to the ungrounded terminal of the winding 208. The normally open contact 230 is connected through line 232 to the common line 151.

The secondary winding 26 of the differential transformer is connected between the common line 151 and the input of the amplifier 153.

A movable contact 233 engageable, to be grounded, by the lobes on the disc 96, previously referred to, is connected through line 234 and capacitor 236 to the left-hand end of resistor 202 connected to the base of transistor 204.

A transistor 238 is provided for the clock drive. Its emitter is connected to the negative supply terminal, and its collector is connected to ground through the clock winding 118. The base of this transistor is connected through resistor 237 to the spring contact 122 engageable by the grounded pin 120 of the inertia member 112 of the clock. In the diagram the escapement and reduction gearing is indicated by the block marked "Reduction Gearing."

The overall operation of the instrument may now be described as follows:

Assuming the instrument to be at rest in a bore hole and that contact 192 is not engaging either of contacts 196 or 198, and that also there is no contact between 233 and either of the lobes of disc 96, relay windings 182 and 208 will be deenergized. The common line 151 is disconnected from the negative supply terminal, so that the oscillator 140 and the amplifier 153 are deenergized. This, in turn, means that the primary winding of the differential transformer is deenergized, and there is also no supply of reference current to the phase detector 170. The bases of both transistors 178 and 204 are negative and these, together with transistors 180 and 206 are nonconducting. Since both motor terminals are connected to the negative supply terminal, the motor 40 remains stationary.

The only current which is flowing is that involved in operation of the clock. This current flows only intermittently when the contact 120 on the inertia member 112 engages the contact 122 to render conductive the transistor 238 and supply a current pulse to the driving winding 118. The current thus involved in the clock operation is very small and constitutes only a small drain on the battery 149.

The continuous operation of the clock advances the stylus axially without rotation so that it scribes an axial line on the chart.

The conditions just described continue if the drift of pressure is not such as to ground either of the contacts 196 or 198. The play of contact 192 between the contacts 196 and 198 may be quite small but is desirably such as to avoid repeated cycles of operation unless significant pressure changes are involved.

Assume now a cycle of operation which is initiated by engagement of one of the lobes on disc 96 with the contact 233. The purpose of this clock controlled initiation of a cycle of operation is to secure accurate readings at intervals (for example, of thirty minutes) even if pressure changes are not sufficient to produce engagement of contact 192 with either of contacts 196 or 198. Involved here is a check of operation. If, for some reason, a maloperation of the circuitry has occurred, it will be brought to attention by production of an abnormal record.

The grounding of contact 233 produces a positive pulse through capacitor 236 to the base of transistor 204.

The use of the capacitor insures that such a positive pulse is emitted only once as a lobe of disc 96 engages contact 233. Continued contact will not produce continued conductivity of transistor 204. The transient conductivity of transistor 204 produces conduction of transistor 206 energizing relay winding 208. Closure of contact 212 of this relay provides a self-locking action, since winding 208 will then be energized from the negative supply terminal through the normally closed contact between 186 and 224.

When winding 208 is energized, movable contact 210 engages contact 216 so that the motor 40 becomes energized with its left-hand terminal grounded and its right-hand terminal connected to the negative supply terminal through contacts 184 and 188. The operation of the motor 40 moves the differential transformer primary assembly in the direction to cause contact 196 to engage the contact 192. During this movement the differential transformer remains deenergized, and accordingly no action is initiated by it.

When contact 196 engages contact 192, the base of transistor 178 is grounded. Accordingly both transistors 178 and 180 conduct and winding 182 is energized. This energization causes contact 186 to engage contact 230 with resulting energization of the oscillator, the amplifier, the primary of differential transformer 28 and the phase detector 162. At the same time engagement between contacts 186 and 224 is broken so that winding 208 is deenergized and its movable contacts returned to normal condition. The movement of motor 40 is thus arrested momentarily.

The primary winding of the differential transformer has now moved relative to the secondary winding so that an output from the secondary has a phase relationship producing through the amplifier 153 and the phase detector 162 an output which provides a positive condition, relative to the negative supply terminal, of the base of transistor 178. This condition persists and winding 182 thus remains energized by an effective locking action even though immediately thereafter engagement between contacts 192 and 196 is broken by motor operation. Examining the connections to the motor, it will be seen that now negative potential is applied to its left hand terminal while its right hand terminal is grounded through engagement of contact 184 with contact 190. The motor is accordingly operated in the reverse direction to move the contact 196 away from the contact 192, the latter being positioned by the Bourdon tube.

Motion of the primary assembly of the differential transformer now continues until the null relationship of the primary and secondary elements of the differential transformer is reached, this condition corresponding to a position of pin 192 about midway between pins 196 and 198. When this condition occurs, the output of the phase detector becomes zero and transistors 178 and 180 are cut off, deenergizing the winding 182. The parts are thus restored to initial condition with the motor deenergized. The oscillator and amplifier are also deenergized. The primary assembly of the differential transformer is then in a definite position relative to the secondary, and the stylus is brought to a rotary position corresponding to the position of the upper end of the Bourdon tube, the movement from a zero datum being greatly magnified as previously described. The position of the stylus is then maintained until a new cycle is initiated either by the clock or by a change of pressure sufficient to produce engagement between contact 192 and one or the other of contact 196 and 198. Pressure changes may start a cycle of operation by engagement of contact 192 with either of contacts 196 and 198 depending upon the sense of pressure change. Assume first the initiation of a cycle by engagement between 192 and 198.

This will produce energization of transistor 204 and of winding 208. A cycle is initiated which is identical with that previously described. Motor operation is first produced to move contacts 196 and 198 toward the left as viewed in the circuit diagram removing contact 198 from contact 192 immediately and ultimately producing contact between 196 and 192. The motion is then reversed, and the null condition is reached as previously described.

On the other hand, if the change in pressure is such as to cause contact 192 to engage contact 196, the cycle will correspond to only the last part of that described, starting with the energization of the relay winding 182.

It will now be seen that in the case of each of the three alternative types of cycle, the termination of operation with the null condition of the differential transformer involves an approach to this null condition in the same direction; i.e., the motor 40 rotates the primary assembly of the differential transformer in the same direction. Thus, there is avoidance of mechanical backlash such as would occur, to the detriment of accuracy, if sometimes the null condition was reached by movement in one direction, and sometimes by movement in the other direction.

It will be evident that it is immaterial in which direction the secondary detector winding 26 and contact 192 are moved by increase, as contrasted with decrease, of pressure. The connections may be interchanged for either result.

It will be evident that various changes in details of construction and operation may be made without departing from the invention as described in the following claims.

What is claimed is:

1. Measuring apparatus comprising:
   a differential transformer having primary and secondary relatively movable elements;
   means for exciting the primary element of said differential transformer;
   phase sensitive detecting means having connections receiving inputs from the secondary element of said differential transformer and from said means for exciting said primary element and providing an output reversible in response to passage of said differential transformer elements through a null position;
   a reversible motor;
   means indicating the operation of said motor;
   sensing means connected to one of said elements of the differential transformer to displace said element in accordance with changes of a variable sensed by said sensing means;
   means connecting said motor to the other of said elements of the differential transformer to effect drive of that element by the motor;
   and control means connected to deliver power to operate said motor reversibly, said control means receiving said output of said phase sensitive detecting means and operating said motor to drive the last mentioned element to approach a stationary null position with respect to the other of said elements always in the same direction of relative movements of said elements.

2. Measuring apparatus comprising:
   a differential transformer having relatively movable primary and secondary elements;
   means for exciting said primary element;
   phase sensitive detecting means having connections receiving inputs from said secondary element and from said means for exciting said primary element and providing an output reversible in response to passage of said primary and secondary elements through a relative null position;
   a reversible motor;
   means indicating the operation of said motor;
   sensing means connected to one of the elements of said differential transformer to displace said element in accordance with changes of a variable sensed by said sensing means;
   means connecting said motor to the other of said elements of the differential transformer to effect drive of that element by the motor;

switching means connected to be operated by the elements of said differential transformer to be switched to a first condition in response to deviation of said elements from null in excess of a predetermined deviation in one direction of relative movement of said elements and to be switched to a second condition in response to deviation of said elements from null in excess of a predetermined deviation in the other direction of relative movement of said elements;

and control means connected to deliver power to operate said motor reversibly, said control means receiving the output of said phase sensitive detecting means and normally maintaining said motor inactive, but responsive to either of said first and second conditions of said switching means to initiate operation of the motor to drive the motor-driven element of said differential transformer to a null position with respect to the other of said elements.

3. Measuring apparatus comprising:

a differential transformer having primary and secondary relatively movable elements;

means for exciting the primary element of said differential transformer;

phase sensitive detecting means having connections receiving inputs from the secondary element of said differential transformer and from said means for exciting said primary element and providing an output reversible in response to passage of said differential transformer elements through a null position;

a reversible motor;

means indicating the operation of said motor;

sensing means connected to one of said elements of the differential transformer to displace said element in accordance with changes of a variable sensed by said sensing means;

means connecting said motor to the other of said elements of the differential transformer to effect drive of that element by the motor;

switching means connected to be operated by the elements of said differential transformer to be switched to a first condition in response to deviation of said elements from null in excess of a predetermined deviation in one direction of relative movement of said elements and to be switched to a second condition in response to deviation of said elements from null in excess of a predetermined deviation in the other direction of relative movement of said elements;

and control means connected to deliver power to operate said motor reversibly, said control means receiving the output of said phase sensitive detecting means and normally maintaining said motor inactive, but responsive to either of said first and second conditions of said switching means to initiate operation of the motor to drive the last mentioned element to approach a stationary null position with respect to the other of said elements always in the same direction of relative movements of said elements.

4. Measuring apparatus comprising:

a differential transformer having primary and secondary relatively movable elements;

means for exciting the primary element of said differential transformer;

phase sensitive detecting means having connections receiving inputs from the secondary element of said differential transformer and from said means for exciting said primary element and providing an output reversible in response to passage of said differential transformer elements through a null position;

a reversible motor;

means indicating the operation of said motor;

sensing means connected to one of said elements of the differential transformer to displace said element in accordance with changes of a variable sensed by said sensing means;

means connecting said motor to the other of said elements of the differential transformer to effect drive of that element by the motor;

switching means connected to be operated by the elements of said differential transformer to be switched to a first condition in response to deviation of said elements from null in excess of a predetermined deviation in one direction of relative movement of said elements and to be switched to a second condition in response to deviation of said elements from null in excess of a predetermined deviation in the other direction of relative movement of said elements;

and control means connected to deliver power to operate said motor reversibly, said control means receiving said output of said phase sensitive detecting means and normally maintaining said motor inactive, but responsive to either of said first and second conditions of said switching means to initiate operation of the motor to drive the last mentioned element to approach a stationary null position with respect to the other of said elements always in the same direction of relative movements of said elements, said control means being effective, if the deviation of said elements of the differential transformer to switch said switching means to one of said conditions is not in the direction from which the null condition may be approached as stated, to provide movement through and beyond the null position, switching of said switching means to the other of said conditions and then reversal of movement so as to effect attainment of the null position by relative movement in said stated direction.

5. Measuring apparatus comprising:

a differential transformer having primary and secondary relatively movable elements;

means for exciting the primary element of said differential transformer;

phase sensitive detecting means having connections receiving inputs from the secondary element of said differential transformer and from said means for exciting said primary element and providing an output reversible in response to passage of said differential transformer elements through a null position;

a reversible motor;

means indicating the operation of said motor;

sensing means connected to one of said elements of the differential transformer to displace said element in accordance with changes of a variable sensed by said sensing means;

means connecting said motor to the other of said elements of the differential transformer to effect drive of that element by the motor;

and control means connected to deliver power to operate said motor reversibly, said control means receiving the output of said phase sensitive detecting means and normally maintaining said motor inactive, but responsive to predetermined deviations of said elements of the differential transformer from null position to initiate operation of the motor to drive the last mentioned element to a null position with respect to the other of said elements, said control means including means effecting nulling of the elements of said differential transformer at spaced intervals irrespective of the occurrence of said predetermined deviations.

6. Measuring apparatus comprising:

a differential transformer having primary and secondary relatively movable elements;

means for exciting the primary element of said differential transformer;

phase sensitive detecting means having connections receiving inputs from the secondary element of said differential transformer and from said means for exciting said primary element and providing an output reversible in response to passage of said differential transformer elements through a null position;

a reversible motor;

means indicating the operation of said motor;

sensing means connected to one of said elements of the differential transformer to displace said element in accordance with changes of a variable sensed by said sensing means;

means connecting said motor to the other of said elements of the differential transformer to effect drive of that element by the motor;

and control means connected to deliver power to operate said motor reversibly, said control means receiving the output of said phase sensitive detecting means and normally maintaining said motor inactive, but responsive to predetermined deviations of said elements of the differential transformer from null position to initiate operation of the motor to drive the last mentioned element to approach a stationary null position with respect to the other of said elements always in the same direction of relative movements of said elements, said control means including means effecting nulling of the elements of said differential transformer at spaced intervals irrespective of the occurrence of said predetermined deviations.

References Cited by the Examiner

UNITED STATES PATENTS 1,837,222    12/1931    Kannenstine _____ 73—152

OTHER REFERENCES

Frictionless Differential Transformers Assure Maximum Accuracy for New Altimeter, Military Systems Design, Nov.–Dec. 1959 (pages 316 and 317).

LOUIS R. PRINCE, *Primary Examiner.*

RICHARD QUEISSER, *Examiner.*